United States Patent Office 2,961,465
Patented Nov. 22, 1960

2,961,465

ALKALI METAL DERIVATIVES OF DI-N-SUBSTITUTED FORMAMIDES

Leo L. Contois, Jr., Burlington, Vt., assignor to Monsanto Chemical Company, St. Louis, Mo., a corporation of Delaware No Drawing. Original application Apr. 26, 1954, Ser. No. 425,735, now Patent No. 2,817,649, dated Dec. 24, 1957. Divided and this application June 11, 1957, Ser. No. 664,918

4 Claims. (Cl. 260—561)

This application is a division of my co-pending application Serial No. 425,735, filed April 26, 1954, now U.S. 2,817,649, and relates to alkali metal derivatives of di-N-substituted formamides and to methods for preparing same.

It is an object of this invention to provide alkali metal derivatives of di-N-substituted formamides and methods for preparing same.

The above and related objects are attained by reacting an alkali metal or an alkali metal amide with a di-N-substituted formamide at a temperature of 50–100° C. in an anhydrous solvent medium that is free of aliphatic halogen atoms and reactive hydrogen atoms.

The following examples are given in illustration and are not intended as limitations on the scope of this invention. Where parts are mentioned, they are parts by weight.

*Example I*

Place 1,000 parts of anhydrous N,N-dimethyl formamide in a suitable reaction vessel and add about 75 parts of sodamide thereto. Heat the resultant mixture to reflux temperature with agitation under anhydrous conditions in order to initiate an ammonia-liberating reaction and maintain the agitated reaction mixture at reflux temperature until the evolution of ammonia ceases. This normally requires about 20–24 hours. The product is a suspension of the sodium derivative of N,N-dimethyl formamide in N,N-dimethyl formamide.

An identical product is obtained when a stoichiometrically equivalent amount of metallic sodium is substituted for the sodamide and Example I is otherwise repeated in the described manner. In this case, however, hydrogen is evolved during the reaction of the metallic sodium with the N,N-dimethyl formamide.

*Example II*

Place 1,000 parts of anhydrous N,N-diphenyl formamide in a suitable reaction vessel and add about 100 parts of potassium amide thereto. Heat the resultant mixture to reflux temperature with agitation under substantially anhydrous conditions in order to initiate an ammonia-liberating reaction and maintain the agitated reaction mixture at reflux temperature until the evolution of ammonia ceases. This normally requires about 20–24 hours. The product consists essentially of a suspension of the potassium derivative of N,N-diphenyl formamide in N,N-diphenyl formamide, the potassium derivative being only slightly soluble in the unreacted N,N-diphenyl formamide.

The compounds of the present invention are alkali metal derivatives of di-N-substituted formamides having the general formula

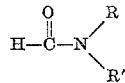

wherein R and R' may be the same or different and are taken from the group consisting of alkyl and aryl radicals. Thus, R and R' may represent phenyl, benzyl, tolyl, naphthyl, cyclohexyl, methyl, ethyl, propyl, isopropyl, butyl, heptyl, octyl, 2-methylbutyl, dimethylisopropyl, ethylpropyl, etc. Representative di-N-substituted formamides having the general formula given above include N,N-dimethyl formamide, N,N-diethyl formamide, N,N-dibutyl formamide, N,N-dioctyl formamide, N,N-di(ethylisobutyl) formamide, N,N-diphenyl formamide, N,N-dicyclohexyl formamide, N,N-ditolyl formamide, N-methyl, N-phenyl formamide, N-ethyl, N-tolyl formamide, etc. Mixtures of two or more such di-N-substituted formamides may be used if desired.

In order to prepare the alkali metal derivatives of the present invention, a di-N-substituted formamide having the formula given above is reacted with an alkali metal or alkali metal amide, e.g., sodium, potassium, lithium, rubidium, cesium or an amide thereof, such as metallic sodium, metallic potassium, sodamide, potassium amide, etc. At least one mol of the di-N-substituted formamide should be used for each mol of alkali metal or alkali metal amide. The di-N-substituted formamide should be reacted with the alkali metal or amide thereof in solution in an inert solvent that is free of aliphatic halogen atoms and reactive hydrogen atoms. For purposes of this invention, reactive hydrogen atoms are defined as those which will react with methyl magnesium iodide to liberate methane in the classical Zerewitinoff reaction (see Niederl and Niederl, Micromethods of Quantitative Organic Analysis, p. 263, John Wiley and Sons, New York city, 1947). The solvent medium for the di-N-substituted formamide may conveniently comprise an excess of the di-N-substituted formamide which is to be reacted or may comprise an aliphatic or aromatic hydrocarbon miscible therewith. Mixtures of two or more miscible solvents may be used if desired. At least one volume and, preferably, about 4–6 volumes of the solvent medium should be used for reach volume of the di-N-substituted formamide to be reacted with the alkali metal or alkali metal amide. The reaction should be conducted under anhydrous conditions at a temperature of about 50–100° C. It is preferable to conduct the reaction at reflux temperature and to carry the reaction to completion (i.e., until no more hydrogen is evolved in the case of the alkali metals or until no more ammonia is evolved in the case of the alkali metal amides). The alkali metal derivatives of the di-N-substituted formamides which are formed as a result of this reaction have only limited solubility in the solvent medium and, as a result, will be partially dissolved, but mostly suspended therein. If desired, the solvent medium may be evaporated under anhydrous conditions in an inert atmosphere in order to obtain the thus-prepared alkali metal derivatives in solid form. However, it is preferable to use the alkali metal derivatives in the diluted form in which they are initially obtained. They should be maintained in an anhydrous condition prior to use and, preferably, should be used within a short time after their preparation.

The alkali metal derivatives of di-N-substituted formamides of the present invention may be reacted with vinylidene polymers containing nitrile groups to prepare cationic polyelectrolytes as disclosed and claimed in my co-pending application, Serial No. 425,735, now U.S. 2,817,649. Such preparations are illustrated in the following examples.

*Example III*

Heat to reflux and agitate the suspension of the sodium derivative of N,N-dimethyl formamide in excess dimethyl formamide prepared in Example I and slowly add to the reaction mixture an anhydrous solution of 100 parts of polyacrylonitrile in 1000 parts of N,N-dimethyl formamide. Continue reflux and agitation for about 24 hours.

At the end of this time the reaction has gone to substantial completion. The reaction product is a suspension of the sodium salt of the addition product of polyacrylonitrile and the sodium derivative of N,N-dimethyl formamide. Prepare a suspension of the desired polyelectrolyte by adding 500 parts of ethanol to decompose the sodium salt by replacing the sodium ions thereof with hydrogen ions. Cool the reaction mixture and filter.

In order to purify the polyelectrolyte, wash the filtered residue with N,N-dimethyl formamide and then dissolve the remaining residue in a dilute solution of hydrochloric acid. Filter this solution and treat the filtrate with dilute aqueous ammonia to precipitate the polyelectrolyte. Wash the precipitated polyelectrolyte with water and dry. The thus-recovered cationic polyelectrolyte is soluble in aqueous acidic media, decomposes before a melting point is reached and has excellent soil aggregating and flocculating properties.

*Example IV*

Agitate and heat the suspension of the potassium derivative of N,N-diphenyl formamide in excess N,N-diphenyl formamide prepared in Example II to reflux and add thereto a separately prepared anhydrous solution of 500 parts of a copolymer of about 20 mol percent acrylonitrile and 80 mol percent styrene in 5,000 parts of anhydrous benzene. Continue agitation and reflux for about 24 hours. At the end of this time, the reaction has gone to substantial completion and a reaction product is obtained which is a suspension of the potassium salt of the addition product of the copolymer and the potassium derivative of N,N-diphenyl formamide. Add 500 parts of ethanol to the reaction mixture to decompose the potassium salt and form a suspension of the desired polyelectrolyte by replacing the potassium ions of the salt with hydrogen ions. Cool the reaction mixture and filter.

In order to purify the polyelectrolyte, wash the residue with benzene and then dissolve the washed residue in a dilute solution of hydrochloric acid. Filter this solution and neutralize the filtrate with dilute aqueous ammonia to precipitate the polyelectrolyte. Wash the polyelectrolyte with water and dry. The thus-recovered product is soluble in aqueous acidic media, decomposes before a melting point is reached and has excellent soil aggregating and flocculating properties.

For further details as to the utility of the alkali metal derivatives of di-N-substituted formamides in reacting with vinylidene polymers containing nitrile groups to form cationic polyelectrolytes, reference is made to the entire disclosure of my co-pending application Serial No. 425,735, now U.S. 2,817,649, all of which is incorporated herein by reference.

The above description and particularly the examples are set forth by way of illustration only. Many other variations and modifications thereof will be apparent to those skilled in the art and can be made without departing from the spirit and scope of the invention herein described.

What is claimed is:

1. A process for preparing a reaction product of an alkali metal compound and a di-N-substituted formamide which consists essentially of agitating 1 mol of a compound taken from the group consisting of alkali metals and alkali metal amides with an anhydrous organic solvent solution containing at least 1 mol of a di-N-substituted formamide, at a temperature of about 50–100° C.; said alkali metal amide conforming to the formula $M-NH_2$ wherein M is an alkali metal atom; said di-N-substituted formamide conforming to the formula:

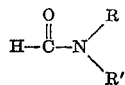

wherein R and R′ are independently selected from the group consisting of alkyl radicals containing 1–8 carbon atoms, phenyl, benzyl, tolyl, naphthyl and cyclohexyl; said organic solvent being selected from the group consisting of aliphatic hydrocarbons, aromatic hydrocarbons, a di-N-substituted formamide of the formula above set forth, and mixtures thereof.

2. A reaction product of an alkali metal compound and a di-N-substituted formamide that is prepared by the process of claim 1.

3. A process as in claim 1 wherein the compound reacted with the di-N-substituted formamide is an alkali metal.

4. A process as in claim 1 wherein the compound reacted with the di-N-substituted formamide is an alkali metal amide.

References Cited in the file of this patent

Wollm et al.: Berichte, vol. 8, p. 1196 (1875).
Tobias: Berichte, vol. 15, pp. 2450–2451, p. 2867 (1882).
Beilstein: Handbuch der Org. Chem., vol. 4, p. 58 (1922).
Picket et al.: Berichte, vol. 21, p. 1107 (1888).
Shaw: J.A.C.S., vol. 76, p. 1385 (1954).